Figure 1:
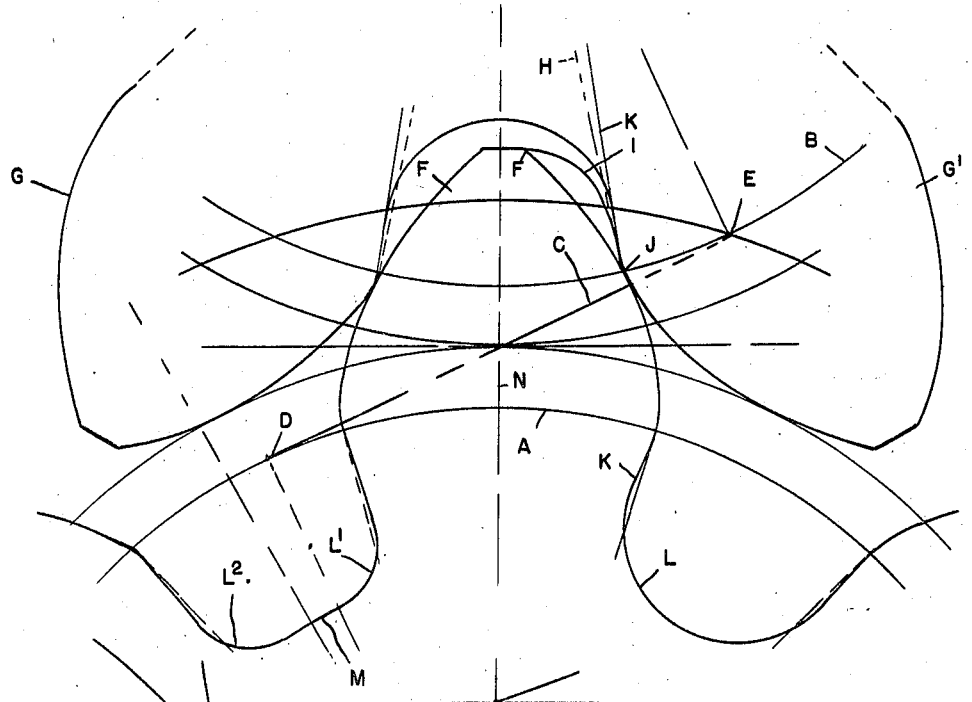

Dec. 29, 1942.  T. R. ZIMMER  2,306,854
GEAR
Filed June 29, 1942

INVENTOR.
THOMAS R. ZIMMER
BY
Whittemore Hulbert+Belknap
ATTORNEYS

Patented Dec. 29, 1942

2,306,854

UNITED STATES PATENT OFFICE 2,306,854

GEAR

Thomas R. Zimmer, Detroit, Mich., assignor to The Gear Grinding Machine Company, Hamtramck, Mich., a corporation of Michigan Application June 29, 1942, Serial No. 448,950

5 Claims. (Cl. 74—462)

The invention relates to the manufacture of gears of that type in which the height of the tooth or the addendum portion thereof is such as to interfere with the flank of the mating gear. As is well understood, the line of action between two mating gears is the line which is tangent to the base circles thereof. It is also understood that where the tip or outer end of a tooth of one gear crosses the line of action at a point beyond the point of tangency of said line of action to the base circle, such tip will interfere with a tooth flank of the mating gear. In other words, the path of this tip traces an epicycloidal curve which cuts into the radial line, forming the natural flank of an involute tooth inside of the base circle thereof.

There are two ways of avoiding such interference: First, the form of the tip may be changed from the involute curve so as to provide the necessary clearance. This, however, throws that portion of the tooth out of action, so that there is no advantage in retaining it. The other method is to fashion the teeth of the mating gear with an undercut or reentrant curve in the flank portion inside of the base circle. The latter method is difficult to carry out in the commercial manufacture of gears, particularly where the teeth of the gears are fashioned by formed grinder wheels.

It is the object of the instant invention to simplify the manufacture of gears of the type above referred to, and particularly to render it possible to fashion the teeth by form grinding. To this end, the invention consists in the construction as hereinafter set forth.

Figure 2:
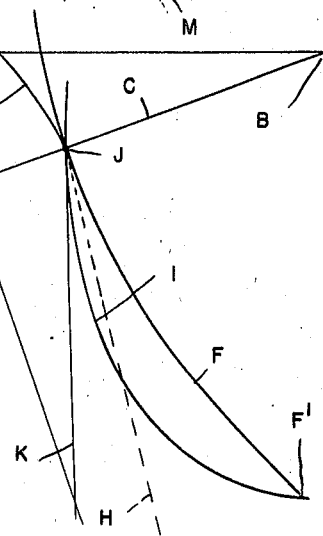

In the drawing:

Figure 1 is a diagram illustrating portions of a pair of mating gears of my improved construction; and Figure 2 is an enlarged view illustrating the modified flank portion of a tooth and one in which the pressure angle is less than that in Figure 1.

In the method of fashioning gear teeth by form grinding, it is impossible to grind any contour having an undercut portion. This is for the reason that a grinder wheel having such cross sectional contour would destroy one portion of the ground surface while coming into contact with another portion thereof. Also, as grinder wheels must be frequently retrimmed to preserve the contour thereof, it is essential that this contour should be such as to be readily fashioned by a trimming mechanism. It would therefore be exceedingly difficult or impossible to fashion gear teeth with a formed grinder wheel if the contour were such as to include a reentrant curve. As has been above stated, the path of the tip of a tooth is an epicycloidal curve which when the tooth is more than a certain length, undercuts the radial flank portion of a tooth in the mating gear. This epicycloidal curve intersects the base circle at the point of origin of the involute curve which forms the working surface of the tooth, and which therefore must be in contact with the mating tooth. However, clearance must be provided in the flank portion which is beyond the exact path of the tip of the mating gear.

To provide the required clearance and at the same time to preserve the full extent of the involute contour of the tooth, I have designed a flank form of the following construction: From the point on the base circle which is the origin of the involute curve, I form an inwardly extending curve, preferably a straight-line, which is at an angle to a radial line from this point to the center of the gear. The angle between this straight-line portion and a radial line is at least equal to that of a tangent to the epicycloidal curve at the said point on the base circle. Consequently, this straight-line portion will be completely outside of the said curve, and the farther inward it extends the greater will be the clearance from the curve. The remainder of the flank portion of the tooth may be formed by one or more arcuate curves which lie completely outside the cycloidal path of the mating gear tooth. This forms a simple contour line which is easily trimmed by the grinder wheel trimming mechanism, and which provides the required amount of clearance without destroying any part of the involute curve.

As shown in detail, A is the base circle of one gear and B the base circle of the mating gear. G is the line of action which is tangent to the two base circles at points D and E. F is an involute tooth of one gear wheel and G and G' the adjacent involute teeth of the mating gear wheel. It will be noted that the addendum portions of these teeth are so extended that the paths of movement of the tip portions thereof undercut the radial lines H which extend from the points of origin on the base circles of the several involute curves. I is the epicycloidal curve forming the path of movement of the point F' on the tooth F, and this curve crosses the radial line H from the point J on the base circle B. Line K is tangent to the curve I at the point J and, therefore, extends at a corresponding angle to the radial line H. L is an arcuate curve which is tangent to the inner end of the line K and which completes the flank portion of the tooth.

Instead of forming the flank portions of adjacent teeth with a single arcuate curve L, I may form these portions of separate arcuate curves L and $L^2$ of smaller radius, these being tangent to the line K and also with a line M forming the bottom of the interdental space. In fact the form of the curve is immaterial if it provides the required amount of clearance but for simplicity in the trimming mechanism, it is composed of circular arcs and straight lines.

Gear wheel teeth formed as above described may have the addendum portions thereof extended as far as desired within a certain limit. This limit is where the line K is still inwardly convergent with respect to the radial line N which forms the center of the interdental space. It is customary in the manufacture of gears to adopt certain standard pressure angles, such for instance as 20°. The larger the pressure angle, the longer the addendum portion of the tooth may be made without interference with the flank of the mating gear, but it is sometimes desirable to use a smaller pressure angle. By my improvement such smaller pressure angle may be used while still retaining the desired length of addendum portion of the teeth and without interference with the tooth flanks of the mating gear.

What I claim as my invention is:

1. A gear tooth having an involute portion extending from the outer tip to its point of origin on the base circle, a contour portion extending inward towards the center line of the tooth from said point of origin at a small angle to a radial line passing through said point, and an arcuate portion tangent to said inwardly extending portion completing the flank of the tooth.

2. A gear tooth having an involute portion extending from the outer tip to its point of origin on the base circle, a straight-line portion extending inward and towards the center line of the tooth from said point of origin at a small angle to a radial line passing through said point, and an arcuate portion tangent to said straight-line portion completing the flank of the tooth.

3. Mating gears designed for a predetermined pressure angle and line of action, the teeth of said gears each having an involute portion extending from its point of origin on the base circle thereof to an outer point, the latter having a path of movement crossing a radial line passing through the corresponding point in a mating tooth, the flank portion of each tooth having a contour portion extending inwardly from said point of origin of its involute curve at an angle to said radial line such as to lie wholly outside the path of movement of the mating tooth, and an arcuate portion tangent to the inner end of said inwardly extending portion completing the flank portion of the tooth.

4. Mating gears designed for a predetermined pressure angle and line of action, the teeth of said gears each having an involute portion extending from its point of origin on the base circle thereof to an outer point, the latter having a path of movement crossing a radial line passing through the corresponding point in a mating tooth, the flank portion of each tooth having a straight-line contour portion extending inwardly from said point of origin of its involute curve at an angle to said radial line, such as to lie wholly outside the path of movement of the mating tooth but inside of a line passing through said point parallel to a radial line at the center of the interdental space, and an arcuate portion tangent to the inner end of said straight-line portion completing the flank of the tooth.

5. A gear tooth for mating gears of that type in which the path of the outer diameter of the teeth lies beyond the line of action between the teeth of said gears, said tooth having an involute contour extending outwardly from the point of origin of the curve on its base circle to the outer end of the tooth, also a straight-line portion extending inwardly from said point at an angle to a radial line passing through said point, such as to lie wholly outside of the epicycloidal path of movement of the tip of a mating tooth but inside of a line through said point parallel to a radial line at the center of the interdental space, and an arcuate portion tangent to the inner end of said straight-line portion completing the flank of the tooth.

THOMAS R. ZIMMER.